United States Patent
Jochim et al.

(10) Patent No.: US 9,042,579 B2
(45) Date of Patent: May 26, 2015

(54) MITIGATING THE EFFECTS OF AUDIO INTERRUPTIONS VIA ADAPTIVE AUTOMATED FAST AUDIO PLAYBACK

(75) Inventors: Markus Jochim, Troy, MI (US); Thomas M. Forest, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 307 days.

(21) Appl. No.: 13/471,571

(22) Filed: May 15, 2012

(65) Prior Publication Data
US 2013/0308794 A1   Nov. 21, 2013

(51) Int. Cl.
| | |
|---|---|
| H04H 60/04 | (2008.01) |
| H04N 11/00 | (2006.01) |
| G01C 21/36 | (2006.01) |
| H04H 60/27 | (2008.01) |
| G11B 20/10 | (2006.01) |
| G11B 27/00 | (2006.01) |

(52) U.S. Cl.
CPC .......... *G01C 21/3629* (2013.01); *H04H 60/27* (2013.01); *G11B 20/10527* (2013.01); *G11B 27/005* (2013.01); *G11B 2020/10546* (2013.01); *G11B 2020/10694* (2013.01)

(58) Field of Classification Search
USPC .................... 381/58, 107, 123, 56
See application file for complete search history.

(56) References Cited

U.S. PATENT DOCUMENTS

| | | | | |
|---|---|---|---|---|
| 5,437,050 | A | * | 7/1995 | Lamb et al. ................. 725/22 |
| 5,692,213 | A | * | 11/1997 | Goldberg et al. .......... 715/203 |
| 2004/0204945 | A1 | * | 10/2004 | Okuda et al. ............... 704/500 |
| 2007/0003215 | A1 | * | 1/2007 | Ito et al. ..................... 386/68 |
| 2007/0171788 | A1 | * | 7/2007 | Yokoyama et al. ........ 369/47.16 |
| 2008/0013757 | A1 | * | 1/2008 | Carrier ....................... 381/119 |
| 2008/0226101 | A1 | * | 9/2008 | Silber et al. ................ 381/123 |

* cited by examiner

*Primary Examiner* — Duc Nguyen
*Assistant Examiner* — George Monikang

(57) ABSTRACT

An audio interruption and buffering playback system includes a primary audio source for reproducing primary audio content and a secondary audio source for reproducing secondary audio content. A processing device detects an interruption event that includes the secondary audio source reproducing secondary audio content having priority over the primary audio source. The processor mutes the output of the primary audio content in response to the interruption event. A buffer buffers the audio content from the primary audio source during the interruption event. The buffered audio content is reproduced by the processor to the user at an accelerated playback speed following the interruption event.

20 Claims, 3 Drawing Sheets

MITIGATING THE EFFECTS OF AUDIO INTERRUPTIONS VIA ADAPTIVE AUTOMATED FAST AUDIO PLAYBACK

BACKGROUND OF INVENTION

An embodiment relates generally to reproduction of interrupted audio in audio output systems.

Primary audio sources can be categorized into pauseable audio sources and non-pauseable audio sources. Examples of pauseable audio sources include CD players, USB memory sticks used as an audio source, and portable audio devices connected via Bluetooth. Examples of non-pauseable audio sources include XM radio, FM radio, and audio devices connected via an audio jack (line in).

Often during audio reproduction playback, primary audio sources are interrupted by secondary sources such as a navigation device outputting navigation instructions. The navigation devices provide turn-by-turn instructions in the form of audio output to guide a user along the predetermined route. An issue with interrupting the primary source by the secondary source utilizing a device or system where audio navigation instructions and audio is that the user will miss information that would have been output by the primary source during the interruption event. That is, when a navigation maneuver is required, the primary device will be muted for a duration of the time while the navigation device outputs the route instructions. When the interruption of outputting the navigation instructions is complete, reproduction of the audio by the primary audio source is resumed; however, if the navigation information takes priority, then it is possible that audio playback from the primary audio source may be missed or interrupted, such that the user does not hear information by the primary audio source due to the interruption.

SUMMARY OF INVENTION

An advantage of an embodiment is the buffering and playback of primary audio content from a primary audio source when an interruption event occurs as a result of output of secondary audio content from a secondary audio source. After the interruption event occurs that mutes the audio of the primary audio source, the buffered audio content is played back at an accelerated playback speed until the buffered playback can catch up to the reproduction of the primary audio content from the primary audio source. As a result, a user does not miss any of the primary audio content output by the primary audio source as the buffered playback is performed at an accelerated speed which allows the playback to catch up to the primary audio source output so the user can listen live. Moreover, the playback audio content is gradually accelerated to a desired maximum playback rate upon commencement of the playback of the buffered audio, and is gradually decelerated to the speed of the primary audio source output just prior to the buffered audio content catching up to the output of the primary audio content from the primary audio source, thus providing a smooth and seamless transition to the user between the accelerated buffered output and the output from the primary audio source.

An embodiment contemplates a method of presenting audio content to a user. Audio content is reproduced to the user from a primary audio source. A secondary audio source interrupts the audio content output by the primary audio source. The secondary audio source reproduces secondary audio content having priority over the output of the audio content from the primary audio source. The audio content from the primary audio source is muted during the interruption by the secondary audio source. Audio content from the primary audio source is buffered in a buffer at a start of the interruption. The buffered audio content is reproduced to the user at an accelerated playback speed following the interruption.

An embodiment contemplates an audio interruption and buffering playback system. A primary audio source reproduces primary audio content. A secondary audio source reproduces secondary audio content. A processing device detects an interruption event that includes the secondary audio source reproducing secondary audio content having priority over the primary audio source. The processing device mutes the output of the primary audio content in response to the interruption event. A buffer buffers the audio content from the primary audio source during the interruption event. The buffered audio content is reproduced by the processing device to the user at an accelerated playback speed following the interruption event.

DETAILED DESCRIPTION

Figure 1:
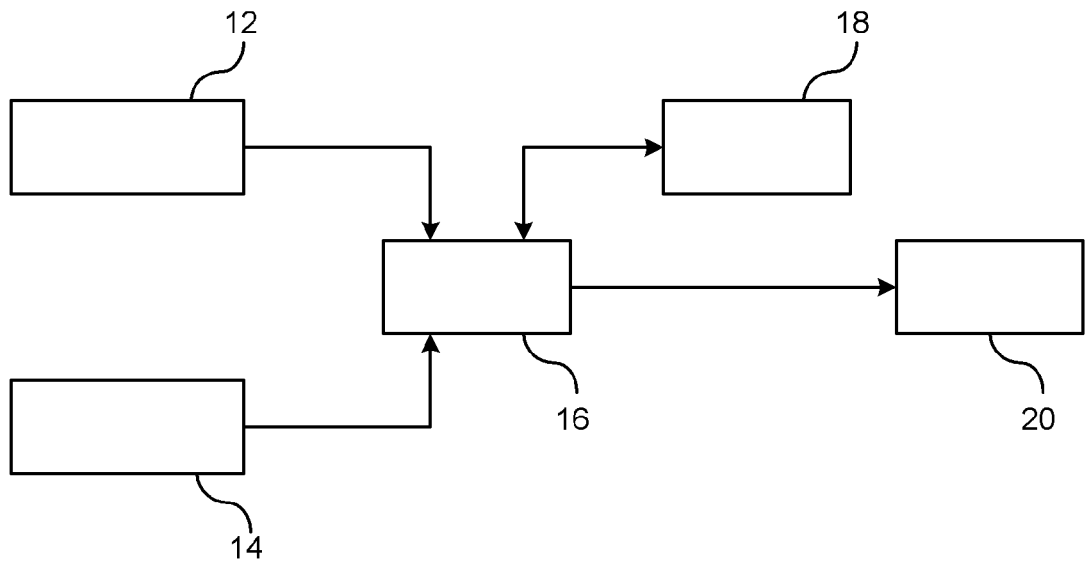
FIG. 1 is a block diagram of a vehicle entertainment and information system.

There is shown in FIG. 1 a vehicle entertainment and information system 10. The vehicle entertainment and information system 10 includes a primary audio source 12 and a secondary audio source 14, a processor 16, and a buffer 18. A speaker system 20 outputs the audio content from primary audio source 12. The processor 16 may be any type of processing device. The speaker system 20 may also output audio content from the secondary audio source 14, or the secondary audio source 14 may include a speaker that is independent of the speaker system 20 for outputting the audio content from the secondary audio source 14.

The primary audio source 12 includes, but is not limited to, AM/FM radio, satellite radio, CD players, portable audio devices (connected by a wired interface such as audio auxiliary interface or by a wireless interface such as Bluetooth), and USB memory sticks for outputting music, news, or other information to a user.

The secondary audio source 14 includes, but is not limited to, navigation units, devices for receiving phone calls, devices for receiving text messages. The secondary audio sources 14 are devices wherein the audio content is output audibly.

The processor 16 may control multiple tasks within the vehicle entertainment and information system 10. For example, the processor 16 may detect the interruption event for controlling the primary audio output and a buffer 18 for storing the primary audio content in the event the interruption event occurs. The interruption event occurs when the primary audio source 12 is outputting primary audio content to the user and the secondary audio source 14 interrupts the primary audio source 12 by outputting secondary audio content. Typically, the secondary audio content is information that requires the immediate attention to the user such as directions from a navigation device. As a result, the processor 16 interrupts the primary audio source 12 by muting the audio content output by the primary audio source 12 while the audio content from the secondary audio source 14 is output to the user.

Figure 2:
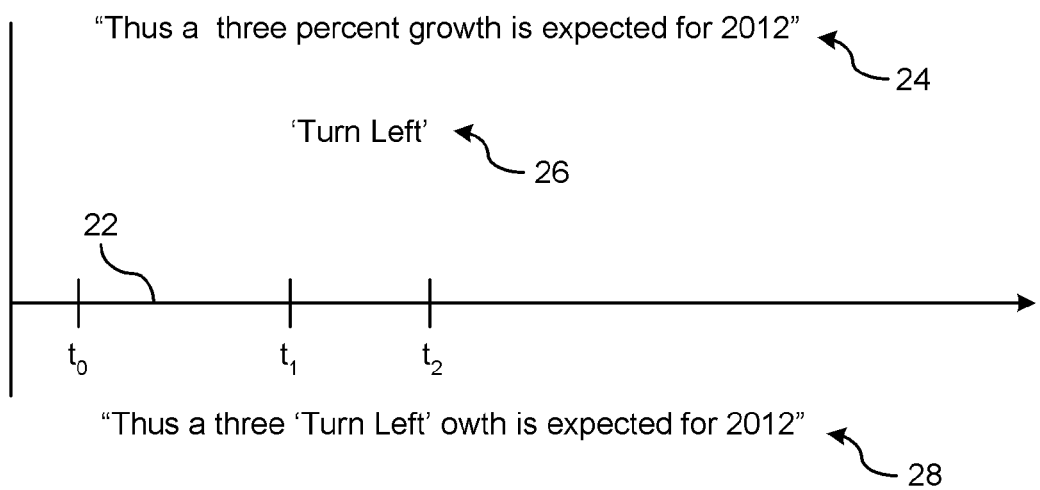
FIG. 2 is a timeline of an interruption event

FIG. 2 illustrates an exemplary timeline illustrating an interruption event. A timeline 22 is shown for reproducing audio content from the primary audio source and the secondary primary source. At the commencement of time $t_0$, the primary audio content 24 is reproduced by the primary audio source (e.g., radio). The primary audio content may for example include a message "Thus a three percent growth is expected for 2012."

At time $t_1$, an interruption event occurs where a message in the form of audio content is output from the secondary audio source while the primary audio source is reproducing the primary audio content. Also at time $t_1$, the audio content from the primary audio source is muted so that the user can listen to the audio content from the secondary audio source. An example of the audio content output from the secondary audio source may include a message "Turn left" as illustrated by 26 in FIG. 2.

At time $t_2$, the reproduction of audio content from the secondary source is complete and the audio content from the primary audio source is un-muted and any remaining portions of the message from $t_2$ is output to the user. The resulting audio message output to the user is "Thus a three 'Turn left!' owth is expected for 2012" as illustrated by 28 in FIG. 2. As a result, a portion of the primary audio content reproduced by the primary audio source is omitted and the audio message from the primary audio source may become incomprehensible.

To allow the user to avoid missing portions of the primary audio content when the interrupting event occurs, the audio content from the primary audio source is buffered. When the audio message from the secondary audio source is complete, the buffered audio content is played back an accelerated speed.

Figure 3:
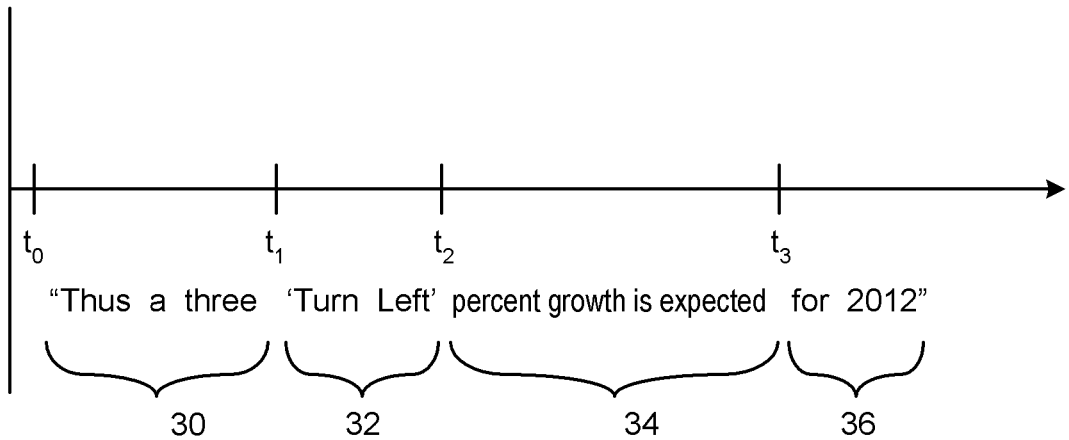
FIG. 3 is a timeline of an interruption event utilizing buffered audio content according to a first embodiment.

FIG. 3 illustrates an exemplary timeline for playing back the buffered audio content. The primary audio content is reproduced from $t_0$ to $t_1$ as represented by 30. The interrupting event occurs at $t_1$. At $t_1$, the primary audio content is muted and buffered. The secondary audio content is output between $t_1$ and $t_2$ as represented by 32. At time $t_2$ when the audio message from the secondary audio source is complete, the buffered audio content from the primary audio source is played back at an accelerated speed as represented by 34. The purpose of playing back the buffered audio content at the accelerated speed is so the playback can catch up with the live output from the primary output source. That is, the accelerated playback is performed only for a limited time until the buffered audio content matches the reproduced audio content directly output from the primary audio source. As shown in FIG. 3, at time $t_2$, the buffered audio content is played back at the accelerated speed until the buffered audio content matches the audio content output by the primary audio source such as at $t_3$. At this instant of time $t_3$, the buffering terminates and the audio content reproduced directly by the primary audio source is output through the speaker which is represented by 36. As a result, all of the audio content reproduced by the primary audio source is output to the user. It should be understood that the buffering of the primary audio content continues even after the audio message from the secondary audio source is complete $t_2$ since playback of the buffered audio content will take time to catch up to the live audio content. As a result, buffering continues until it is determined that the buffered audio output content directly matches the audio content output from the primary audio source. The accelerated speed at which the audio content is played back is determined as a function of the following parameters that include, but are not limited to, a duration of the interruption, a time since a start of the audio playback of the buffered audio content, audio content remaining in the buffer, and an audio format of the primary audio source. The amount of audio content remaining in the buffer may apply to the both the amount of content as well as the actual value of the content (e.g., audio content that would more rapidly accelerate playback of portions that contain silence or low-volume sounds, or different playback of music portions versus speech).

Figure 4:
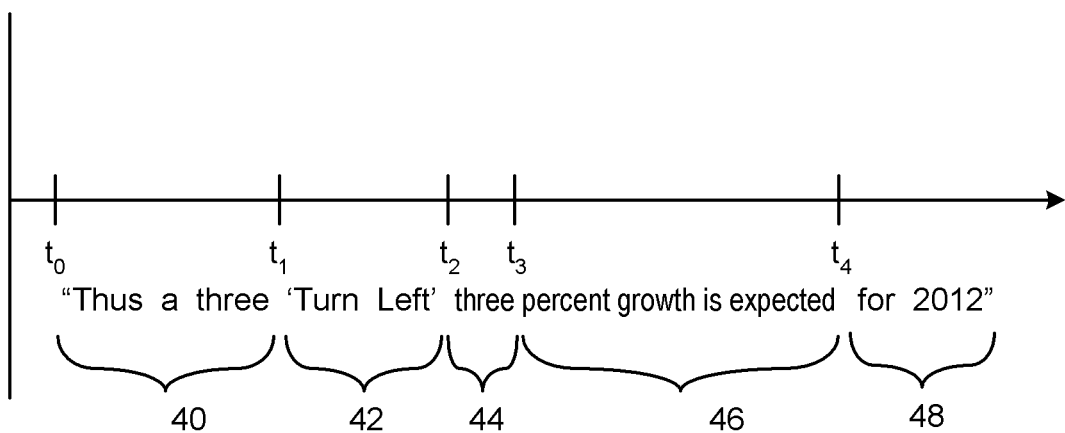
FIG. 4 is a timeline of an interruption event utilizing repetitive and buffered audio content according to a second embodiment.

FIG. 4 illustrates an embodiment where repetitive reproduced audio content is utilized after the interruption. Referring first to FIG. 3 to illustrate an issue, after completion of the interruption event at $t_2$, the playback of the primary audio content resumes directly where it was muted. While this allows the user to avoid missing any portion of the primary audio content, the user may be trying to recollect what exactly was being discussed prior the interruption. Therefore, as shown in FIG. 4, a portion of the primary audio content that was output to the user prior to the interruption event is reproduced again to the user after the interruption is terminated and the playback is initiated. The repetition makes it easier for the user to identify where and what portion of the topic was being discussed prior to the interruption event.

The information that is repetitively reproduced is information buffered in a short duration of time (e.g., 1 sec). For example, the duration of the audio content being repetitively reproduced may be only 1 second of the primary audio content. This is of a sufficient duration that provides the user with familiarity of where primary audio content left off prior to the interruption event. The duration of time in which that information is repetitively reproduced and buffered is predetermined. Moreover, the duration of time may be reconfigurable by users who desire to hear more of the repetitively reproduced primary audio content.

To perform the repetitive reproduction after the interruption event, this requires that constant buffering occur during the reproduction of the primary audio content even though there is no interruption event. Repetitive data is defined as audio that has already been audibly output to the user. However, the constant buffering does not require that large amounts of repetitive data be held in the buffer; rather, only the amount of buffer space that is required to store the data to be repetitively reproduced is allocated. Data stored in the buffer relating to the repetitive information is removed when new information is retrieved. That is, if the allocated buffer space allows only for 1 second duration of time for repetitive data, then the new repetitive data is buffered and the old repetitive data stored in the buffer is removed. As a result, small amounts of data are constantly cycled in and out of the buffer without having to store large amounts of data for a long duration of time. If an interruption event is triggered, then the audio content output within the buffer 1 second prior to the interruption event is saved in the buffer, and the primary audio content that is being reproduced by the primary audio source following the interruption event is also stored in the buffer.

As shown in FIG. 4, primary audio content is output to the user directly from the primary audio source prior to the interruption event as represented by 40. At time $t_1$, audio content from the primary audio source is muted and the audio content from the secondary audio source is output to the user as represented by 42. After the completion of the audio message from the secondary audio source, playback of the primary audio message is reproduced to the user. A portion of the message will include part of the message that was already output to the user as represented by 44. This allows the user to identify the location where the primary audio content left off. For example, prior to the interruption event, the primary audio content "Thus a three" is output to the user. After time instant $t_2$ "three" is repeated in the playback of the buffered information along with the buffered information following the interruption event as illustrated by the accelerated playback 46 and the audio content from the primary audio source 48.

Figure 5:
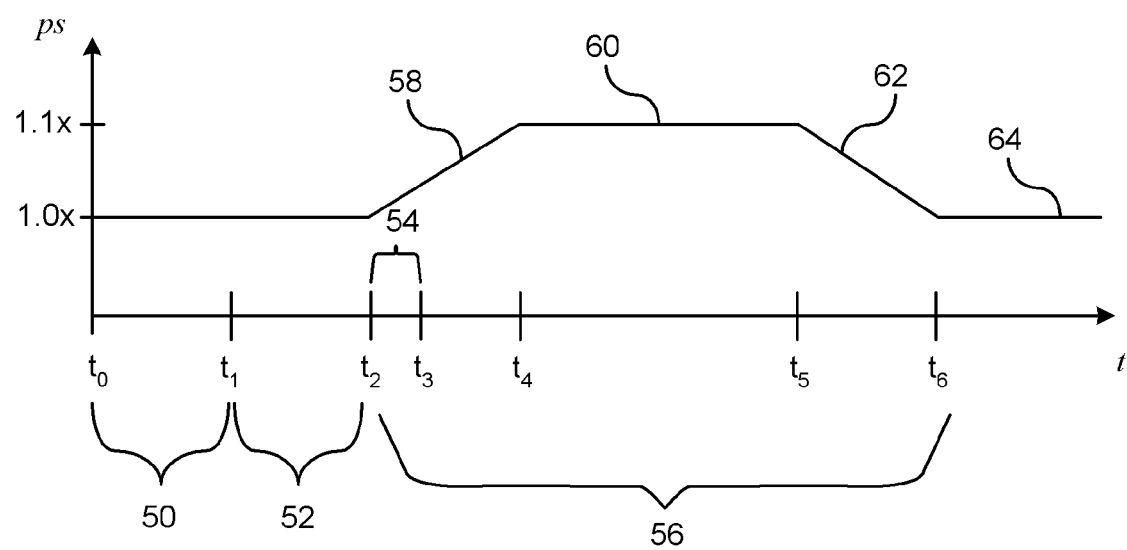
FIG. 5 is a timeline of an interruption event utilizing accelerated and decelerated buffered audio content according to a third embodiment.

FIG. 5 illustrates an embodiment where the accelerated speed of the buffered audio content is gradually accelerated and decelerated upon the playback of the buffer audio content. An abrupt increase in the playback speed will be noticed by the user and may be perceived as disruptive or annoying. Therefore gradually accelerating the audio playback and gradually decelerating the audio playback provide a smooth and more natural transition into and out of the accelerated playback.

FIG. 5 illustrates an exemplary timeline of a playback speed profile utilizing gradual acceleration and deceleration of buffered audio playback. A timeline is shown that includes a vertical axis that represents the playback speed. For example, a 1.0× speed represents 1 times the normal playback speed of the audio content from the primary audio source, whereas a 1.1× represents 1.1 times the normal playback speed of the audio content from the primary audio source.

The timeline shown that includes an audio content reproduction from a primary audio source and an interruption event from a secondary audio source such as a navigation device. At $t_0$ the audio content from the primary audio source is output to the user as represented by 50. At $t_1$, an interruption event occurs by the navigation device for outputting navigation instructions to the user as represented by 52. Also at $t_1$, the audio content from the radio is buffered. Audio content from the radio for a predetermined amount of time prior to $t_1$ is also added to the buffer which is referred to as repetitive audio content.

At $t_2$, the audio output of the navigation instructions to the user is complete. Also at $t_2$, playback of the buffered audio content is reproduced. Included in the buffered audio content is the repetitive audio content 54 followed by the primary audio content from the radio that started buffering at the commencement of the navigation instructions as represented by 56.

A predetermined speed is used as the maximum playback speed to playback the buffered audio content. The maximum playback speed may be fixed or may be reconfigurable as different users may feel comfortable with different maximum playback speeds.

In the time period between $t_2$ to $t_4$ as represented by 58, the playback speed of the buffered audio content is gradually increased at a respective rate up to the desired maximum playback speed (e.g., 1.1× the playback speed of the audio content from the primary audio source).

In the time period between $t_4$ to $t_5$ as represented by 60, the buffered audio content is played back at the maximum playback speed for a substantial portion of the playback of the buffered audio content.

Prior to the buffered audio content matching the audio content of the primary output source, the speed at which the buffered audio content is played back to the user is gradually decelerated. Gradually decelerating the playback of the buffered audio content avoids abrupt changes in the transitioning between the output of the buffered audio content and the output of the primary audio source. As shown in FIG. 5, $t_5$ to $t_6$ as represented by 62, the playback speed of the buffered audio content is gradually decreased at a respective rate down to the playback speed that the audio content of the primary audio source is reproduced. The output of the buffered audio content matches the output of the primary audio source when the playback speed is decreased to a same speed of the output of the primary audio source which occurs at $t_6$ in FIG. 5. After $t_6$, output of the buffered audio content is discontinued and only the audio content from the primary audio source is output to the user as represented by 64. As a result, a gradual transition occurs when the buffered audio content is initially reproduced and when the buffered audio content is complete.

The amount of audio content remaining in the buffer may also determine when to begin the deceleration by starting the deceleration process when the amount of audio content within the buffer falls below a certain threshold. For example, the amount of audio content added to the buffer while playback is occurring is a function of how fast the accelerated audio content is being output. To accelerate the playback audio, the audio content is taken out of the buffer at a faster rate than what the audio content of the primary audio source is outputting (e.g., 1.1× the rate of the primary audio source output). If the deceleration profile is also known, then it can be determined in advance how the net content of the buffer will decrease over the deceleration profile. Based on the rate at which the audio content is being output at the accelerated rate over the normal output rate of the primary audio source, the decrease in the amount of audio content that is being buffered can be determined at any instance of time. Not only will the system determine the amount of audio content that should be added to the buffer at any time instance, but the system will determine at which moment the play back of the buffered audio content can begin the gradual deceleration. As a result, when the audio content of the playback matches the output from the primary source, the playback speed of the buffered content will be substantially the same playback speed of the primary audio source and there will be no audio content remaining in the buffer when the match occurs.

It should be understood that the gradual acceleration or deceleration can be non-linear as opposed to linear. Moreover, different and independent strategies may be utilized when determining either the gradual acceleration or the gradual deceleration. For example, a gradual acceleration may be linear whereas the gradual deceleration may be non-linear. The common goal is to seamlessly integrate the accelerated playback to the user without being disruptive or objective to the user.

The duration of time allocated between t4 and t5 may be determined based on various factors including, but not limited to, the duration of the interruption from the secondary audio source; a maximum playback speed; a duration of the repetitive phase; a time it takes to accelerate to the maximum playback speed and to decelerate back to the normal speed of the primary audio content; the strategy for increasing the playback speed (e.g., linear and non-linear). Based on the factors used to calculate the duration between $t_4$ and $t_5$, accelerations and decelerations may be determined for smoothly transitioning between the normal playback speed of the primary audio source and the respective maximum playback speed.

In addition, frequency shifting may be applied to the accelerated audio playback to provide a more natural sound to the buffered audio content output at the accelerated speed.

By buffering missed audio content and playing back the audio content at an accelerated speed, the user also avoids missing any audio content output by the primary audio source. In addition, alternate controls may be implemented wherein the user can opt out of the buffered playback and immediately resume reproduction of the audio content from the primary audio source. An example would be if the user was listening to music and it is not of great significance that the user has missed a portion of the music program. In addition, controls may be implemented where the user can pause the buffered playback if the user is focused on another task such as a complex traffic situation and does not want to focus on the output of the primary audio source. In such an instance, accelerated playback speed may be utilized. Moreover, if the user does not understand a portion of the played back buffered audio content, controls may be implemented that allow the user to repeat a portion of the buffered audio.

While certain embodiments of the present invention have been described in detail, those familiar with the art to which this invention relates will recognize various alternative designs and embodiments for practicing the invention as defined by the following claims.

What is claimed is:

1. A method of presenting audio content to a user, the method comprising the steps of:
    reproducing audio content to the user from a primary audio source;
    a secondary audio source interrupting the audio content output by the primary audio source, the secondary audio source reproducing secondary audio content having priority over the output of the audio content from the primary audio source;
    muting the audio content from the primary audio source during the interruption by the secondary audio source;
    buffering audio content from the primary audio source in a buffer at a start of the interruption, the primary audio source uninterruptedly playing the audio content in real-time while buffering;
    reproducing the buffered audio content to the user at an accelerated playback speed following the interruption, the buffered audio content reproduced to the user further including audio content from a predetermined period of time prior to the interruption by the secondary audio source to the time when the audio content output from the buffer catches up to the real time audio content of the primary audio source, the audio content from the predetermined period of time prior to the interruption allowing the user to recollect the portion of the topic presented to the user prior to the interruption event.

2. The method of claim 1 wherein the buffered audio content is output to the user at the accelerated playback speed until a time when the audio content output from the buffer catches up to the real time audio content of the primary audio source.

3. The method of claim 2 further comprising the step of reproducing the audio content from the primary audio source to the user in real time after the audio content output from the buffer catches up to the real time audio content of the primary audio source.

4. The method of claim 2 wherein the accelerated playback speed is a predetermined speed and is faster than a normal speed at which the real time audio content of the primary audio source is reproduced.

5. The method of claim 2 wherein the accelerated playback speed is reconfigurable.

6. The method of claim 5 wherein the reconfigurable accelerated playback speed is determined as a function of a duration of the interruption.

7. The method of claim 5 wherein the reconfigurable accelerated playback speed is determined as a function a time since a start of the audio playback of the buffered audio content.

8. The method of claim 5 wherein the reconfigurable accelerated playback speed is determined as a function of the audio content remaining in the buffer.

9. The method of claim 5 wherein the reconfigurable accelerated playback speed is determined as a function of an audio format of the primary audio source.

10. The method of claim 5 wherein the reconfigurable accelerated playback speed is determined by a user selecting a playback speed.

11. The method of claim 2 wherein the accelerated playback speed of the buffered audio content is gradually increased from a time the buffered content is initially reproduced to a maximum playback speed.

12. The method of claim 2 wherein the playback speed of the buffered audio content is gradually decreased from the maximum playback speed to a speed that the real time audio content of the primary audio source is reproduced, wherein the time at which the decreased playback speed catches up to the reproduction speed of the real time audio content of the primary audio source occurs when the audio content output from the buffer catches up to the real time audio content of the primary audio source.

13. The method of claim 2 wherein a frequency shift is applied to the accelerated audio playback to provide a more natural sound to the buffered audio content output at the accelerated speed.

14. The method of claim 1 wherein the secondary audio content is produced by a navigation device.

15. The method of claim 1 wherein the secondary audio content is produced by a communication device.

16. An audio interruption and buffering playback system comprising:
    a primary audio source for reproducing primary audio content;
    a secondary audio source for reproducing secondary audio content;
    a processing device detecting an interruption event that includes the secondary audio source reproducing secondary audio content having priority over the primary audio content, wherein the processing device mutes the output of the primary audio content in response to the interruption event; and
    a buffer for buffering the audio content from the primary audio source during the interruption event, the primary audio source uninterruptedly playing the audio content in real-time while buffering;
    wherein the buffered audio content is reproduced by the processing device to the user at an accelerated playback speed following the interruption event, the buffered audio content reproduced to the user further including audio content from a predetermined period of time prior to the interruption by the secondary audio source to the time when the audio content output from the buffer catches up to the real time audio content of the primary audio source, the audio content from the predetermined period of time prior to the interruption allowing the user to recollect the portion of the topic presented to the user prior to the interruption event.

17. The audio interruption and buffering playback system of claim 16 wherein the buffered audio content is reproduced at the accelerated playback speed until a time when the audio content output from the buffer catches up to the real time audio content of the primary audio source.

18. The audio interruption and buffering playback system of claim 16 wherein a frequency shift is applied to the audio content to provide a more natural sound to the buffered audio content output at the accelerated speed.

19. The audio interruption and buffering playback system of claim 16 wherein the processing device gradually increases the playback speed of the buffered audio content from a time the buffered content is initially reproduced to a time when the playback speed reaches a maximum playback speed.

20. The audio interruption and buffering playback system of claim 19 wherein the processing device gradually decreases the accelerated playback speed of the buffered audio content from the maximum playback speed to the speed that the real time audio content of the primary audio source is reproduced, wherein a time at which the decreased playback speed catches up to a reproduction speed of the real time audio content of the primary audio source occurs when the audio content output from the buffer catches up to the real time audio content of primary audio source.

* * * * *